United States Patent [19]

Glaser et al.

[11] Patent Number: 4,994,187

[45] Date of Patent: Feb. 19, 1991

[54] APPARATUS FOR REMOVING SEWAGE SLUDGE FROM THE BOTTOM OR THE SURFACE IN A SETTLING BASIN

[75] Inventors: Bernd Glaser, Hamburg; Uwe Kloth, Stockelsdorf, both of Fed. Rep. of Germany

[73] Assignee: Richard Totzke Mashinen-und Apparatebaue GMBH, Neumunster, Fed. Rep. of Germany

[21] Appl. No.: 394,489

[22] Filed: Aug. 16, 1989

[30] Foreign Application Priority Data

Aug. 17, 1988 [DE] Fed. Rep. of Germany ....... 3827914
Oct. 13, 1988 [DE] Fed. Rep. of Germany ....... 3834891
Nov. 3, 1988 [DE] Fed. Rep. of Germany ....... 3837284

[51] Int. Cl.$^5$ ............................................. B01D 21/24
[52] U.S. Cl. ................................. 210/519; 210/525; 210/528; 210/532.1
[58] Field of Search ............... 210/519, 520, 523, 525, 210/528, 532.1, 533, 541

[56] References Cited

U.S. PATENT DOCUMENTS

| | | | |
|---|---|---|---|
| 1,947,429 | 2/1934 | Townsend et al. | 210/523 |
| 2,073,810 | 3/1937 | Sayers et al. | 210/519 |
| 2,233,641 | 3/1941 | Ramsey | 210/528 |
| 2,263,167 | 11/1941 | Dorr et al. | 210/520 |
| 2,961,100 | 11/1960 | Katz et al. | 210/528 |
| 2,980,934 | 4/1961 | Steindorf | 210/528 |
| 3,136,724 | 6/1964 | Sind et al. | 210/519 |
| 3,216,570 | 11/1965 | Cunetta | 210/528 |
| 3,246,763 | 4/1966 | Baum | 210/519 |
| 3,371,788 | 3/1968 | Smith | 210/528 |
| 3,494,462 | 2/1970 | Band | 210/528 |
| 3,800,955 | 4/1974 | Edgerton et al. | 210/528 |
| 3,926,805 | 12/1975 | Walker | 210/519 |
| 3,951,816 | 4/1976 | Bascope et al. | 210/519 |
| 4,038,185 | 7/1977 | Kline | 210/519 |

FOREIGN PATENT DOCUMENTS 276416 5/1913 Fed. Rep. of Germany .
496236 11/1938 United Kingdom .
847337 9/1960 United Kingdom .

Primary Examiner—Richard V. Fisher
Assistant Examiner—Christopher Upton
Attorney, Agent, or Firm—Harness, Dickey & Pierce

[57] ABSTRACT

Sweeper means for circular settling basins wherein at least a pipe is supported by a radially extending support structure adapted to be rotated about a central vertical axis by driving means, wherein further the discharge end of the pipe being connected to a sewage sludge return line which is extended below the settling basin and extended into the basin in the central area thereof and which is adapted to deliver the sewage sludge outwards of the settling basin, the support structure being suspended on a vertical rotary shaft coupled to the driving means, the other end of the pipe moving in conjunction with the support structure being connected to a rotary connection below the level in said settling basin to which also the sludge return line is connected.

13 Claims, 6 Drawing Sheets

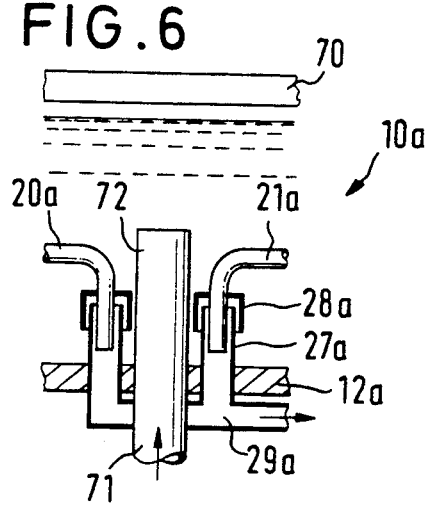
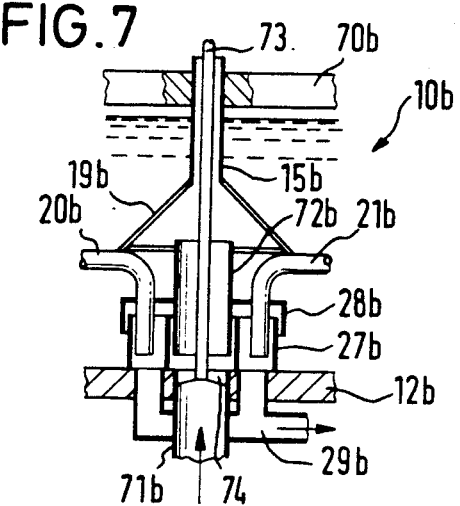
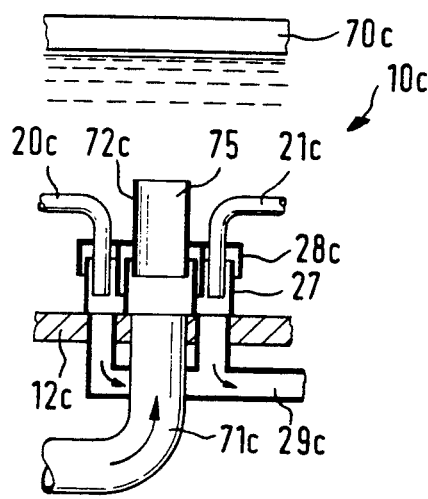
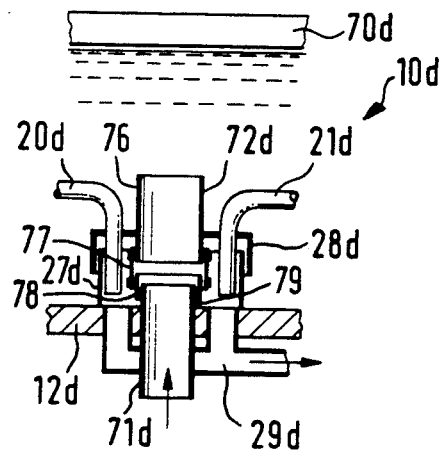
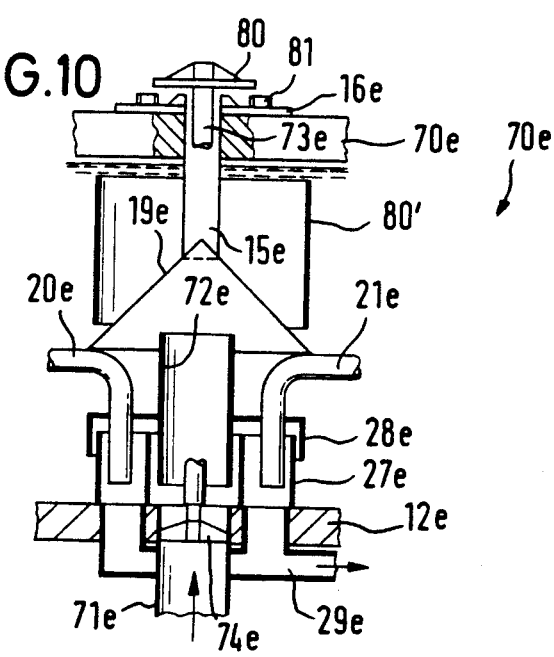

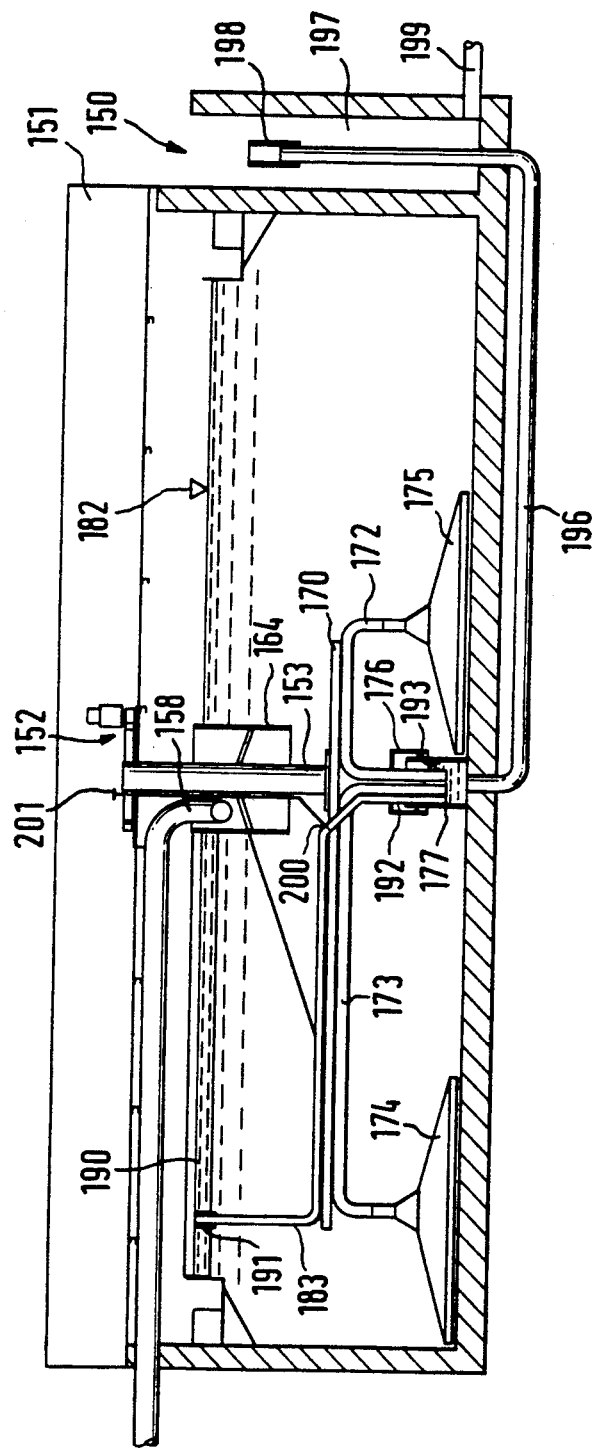

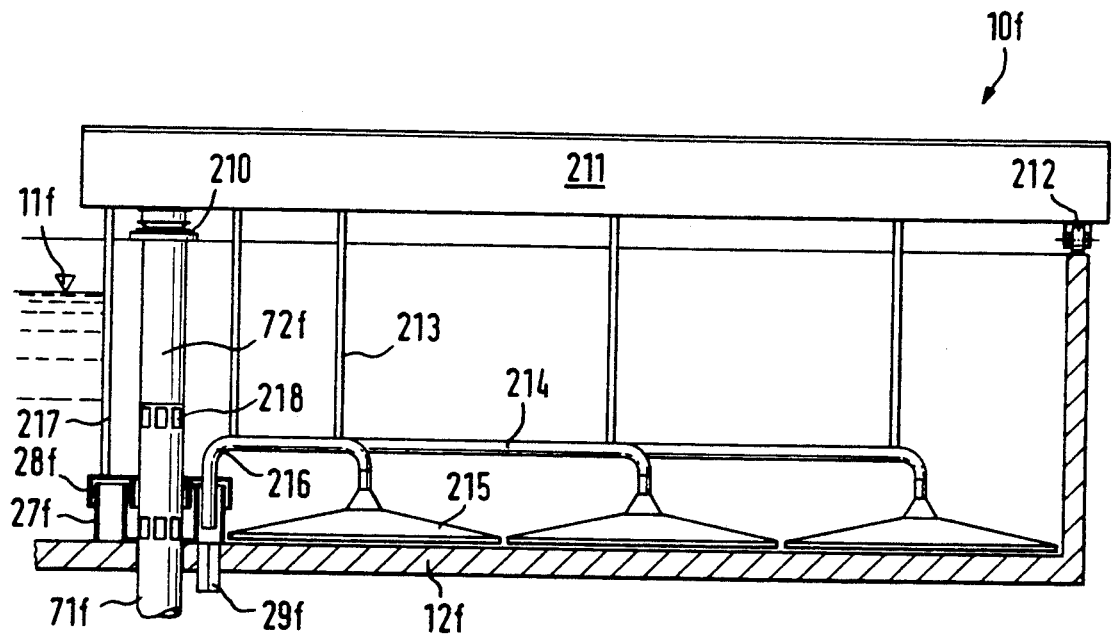

APPARATUS FOR REMOVING SEWAGE SLUDGE FROM THE BOTTOM OR THE SURFACE IN A SETTLING BASIN

The invention refers to an apparatus according to the preamble of patent claim 1.

Solids having a specific weight greater than water are collected on the bottom of a settling basin as bottom sludge. Solids having a specific weight smaller than 1 are collected on the surface of the water to be clarified and form the so-called floating sludge. Bottom sludge and floating sludge are to be removed continuously or at intervals. For this, various structures are known. Hereinafter, only those structures are explained suited for circular basins.

In case of suction removal means, for example, suction mouths, shields or pipes are provided guided near the bottom of the basin. The sludge is conveyed through a pipe into a channel or into a central construction by the suction principle. Such a structure has become known from "Untersuchungen zur Verbesserung des FeststoffrUckhalts an einem längsdurchströmten Nachklärbecken", S. Schlegel, M. Führer, Essen of "Korrespondenz Abwasser" 32nd year of publication, volume 3, 1985, pages 162 to 166.

From the German patent specification 27 40 645, removal means for floating sludge has become known wherein a removing channel attached to a rotating bridge is connected to a trapping container or basin. A pump conveys the floating sludge to a discharge channel surrounding the central construction. The advantage of this removing principle is to be seen in the fact that the floating sludge can be removed independent of the direction of the wind. The arrangement of the pump on the sweeping bridge is to be regarded as disadvantageous. Since the electrical energy for the pump is to be supplied from a stationary terminal from outside or interiorly swiping contacts (swiping rings or the like) are to be used which are subject to wear and which are to be continuously watched due to their corrosion susceptibility. In case of a so-called central driving means, this is stationarily located on a ceiling or a stationary bridge overspanning the basin, and a rotary shaft drives the removing mechanism, e.g. also the shields for the removal of bottom sludge. For circular settling basins having a central driving means, it is also known to rotate a removing shield in conjunction with the rotary shaft, the shield co-operating with a stationary outlet in the basin. The sweeping shield for the floating sludge has a part adapted to change its level which ascends or descends along a ramp-like surface in the area of the outlet for the floating sludge to feed the floating sludge into a funnel-like outlet opening. A stationary outlet for the floating sludge has the disadvantage that a removing of the floating sludge cannot be carried out under unfavourable wind conditions.

The object of the invention is to provide an apparatus for sweeping of circular settling basins such that the necessary inventory for the installation and the material is considerably reduced.

This object is attained by the features of the characterizing portion of patent claim 1.

In the sweeping means according to the invention, a circulating support structure is provided which is suspended on a preferably vertical rotary shaft coupled to the driving means. The rotary shaft in turn is supported by a rigid bridge construction overspanning the settling basin diametrically. Alternatively, a circulating bridge structure could be used which for example is centrally rotatably supported and further supported on the edge of the basin.

The structure of the sweeping means according to the invention necessitates low inventory costs. The rotary connection can be structured with no problems. One has only to take care that it is sufficiently leak-proof to not withdraw water from the settling basin.

To establish the described rotary connection, different structures can be used. According to one embodiment of the invention, a pot is centrally located in the settling basin open from above into which the end of a suction pipe extends, a cup-like lid being located on the pot, the pipe extending through the lid and being tightly and sealingly attached to the lid. The cover or lid substantially does not engage the pot, and an air cushion is arranged between lid and pot. The rotary connection described is absolutely without wear. The air cushion between lid and pot prevents a suction of water and an interruption of the conveyance thereof. It is understood that the air can be replaced by another gas. The maximum pressure depends upon the hydraulic circumstances. Since the rotary connection described is within the settling basin, preferably on the bottom thereof, the water column above the rotary connection presses on the gap between the margin of the lid and the wall of the pot.

According to an embodiment of the invention, an alternative design for a rotary connection provides that the end of the pipe forms a rotary joint in connection with a central pipe connected to the sludge return line. In case of plurality of pipes, they are terminating in a central tube which forms a central rotary joint together with a tube connected to the sludge return line, the rotary joint being also below the water level in the settling basin, preferably on the bottom thereof. The rotary joint has to be structured such that water enters the joint from outside as few as possible.

If the pipe serves for the removing of bottom sludge according to the suction principle, it is required to vent the suction pipes in order to initiate and maintain the suction principle. This can be carried out by a vent bore or a vent valve at the highest point of the suction tube.

It may be appropriate to provide a throttle member in the suction tube which can be actuated by an actuation member extending upwardly, for example a rod or the like.

It is known to feed the water to be clarified into the basin through a corresponding feed line such that the water is centrally discharged, preferably at the half of the level of the settling basin. In connection with the structure described, this can be carried out by a feed line which is guided by a bridge overspanning the basin or by having it extended through the wall of the basin. In many cases, it is desired to supply the water from below through the bottom of the basin. In this case, it has to be avoided that the sludge depositing on the bottom of the basin mixes with the water fed.

In the suction sweeping means according to the invention, a central vertical water supply tube is surrounded by an annular space formed by the pot described above in order to connect a water supply line extending through the bottom of the basin with the annular space.

The pot and lid design and the water supply tube can be structured in different manners. In one embodiment, an annular pot is located on the basin bottom, an annular lid being put on the pot. The water supply tube can separately extend through the annular lid into the inner space defined by the annular pot. The water supply tube can also be connected with the lid so that it rotates in conjunction with the rotation of the suction sweeping means. In the latter case, the water supply tube can concurrently form the radially inward margin of the annular lid. If the air cushion common to the sludge removal and the water supply as well is to be divided, a circular wall may suspend from the lid down into the annular pot having a small radial distance from the inner wall of the pot.

The construction just described has the further advantage that a support for the bridge or sealing structure can be provided overspanning the settling basin. The rotary shaft retaining the support structure for the suction pipes in turn is rotatably supported by a ceiling or a bridge overspanning the basin. In case of large circular basins having for example a diameter of 40 m and more, the bridge has to have a considerable static strength to allow an operator to walk on and to allow the desired support. An embodiment according to the invention provides that a vertically downwardly extending leg is attached to the bridge or sealing construction extending through the hollow rotary shaft down to or into the water supply tube to be supported radially by the supply tube, by the supply line or within the opening in the bottom. This support can be achieved directly by the bridge or by means of a bearing plate and a rotary bearing on a toothed plate which in turn is fixedly attached to the rotary shaft which in turn is rotatably supported by the bridge or ceiling construction. By means of such a support stabile bridge and ceiling constructions can be established which are relatively light weight structured. Even a radial or a "half bridge" can be used which is statically supported by the mentioned leg at the radially inner end. To provide such a half bridge also with sufficient lateralstability, it can be braced by ropes from the basin edge.

If floating sludge is removed, a portion of the discharge line for the floating sludge is moved in the basin, the portion circularly rotating driven by the rotary shaft. The upper inlet of the line portion is slightly below the water surface in the basin so that by no means the floating sludge may enter. The lower end is connected with the stationary line portion of the discharge line through the rotary connection. In case a pump is used for pumping away the floating sludge this can be located stationarily. A pump, however, can be omitted if the outside end of the stationary line portion is below the level of the settling basin. In this case, the floating sludge can be withdrawn after the principle of communicating tubes. In order to achieve an adaptation to the different levels in the settling basin or to vary the suction pressure, respectively, a tube portion can coact with the tube-like end of the stationary discharge line portion in order to adjust the discharge point. This change of elevation can be made manually (through a spindle or the like) or automatically (e.g. through a float control).

The invention will be subsequently described at more details by means of embodiment examples in connection with the drawings.

FIG. 6 shows diagrammatically a modified rotary connection for a sweeping apparatus of FIG. 1.

FIG. 7 shows a further embodiment for a rotary connection.

FIG. 8 shows a further embodiment for a rotary connection.

FIG. 9 shows a further embodiment for a rotary connection.

FIG. 10 shows a rotary connection similar to that of FIG. 7 including an axial support of a bridge construction.

FIG. 13 shows a cross section through a third circular settling basin including a third embodiment of an apparatus of the invention.

FIG. 14 shows a plan view of a detail of the apparatus of FIG. 13.

FIG. 15 shows a combination of a water supply with a sweeping bridge according to the invention.

Figure 1:
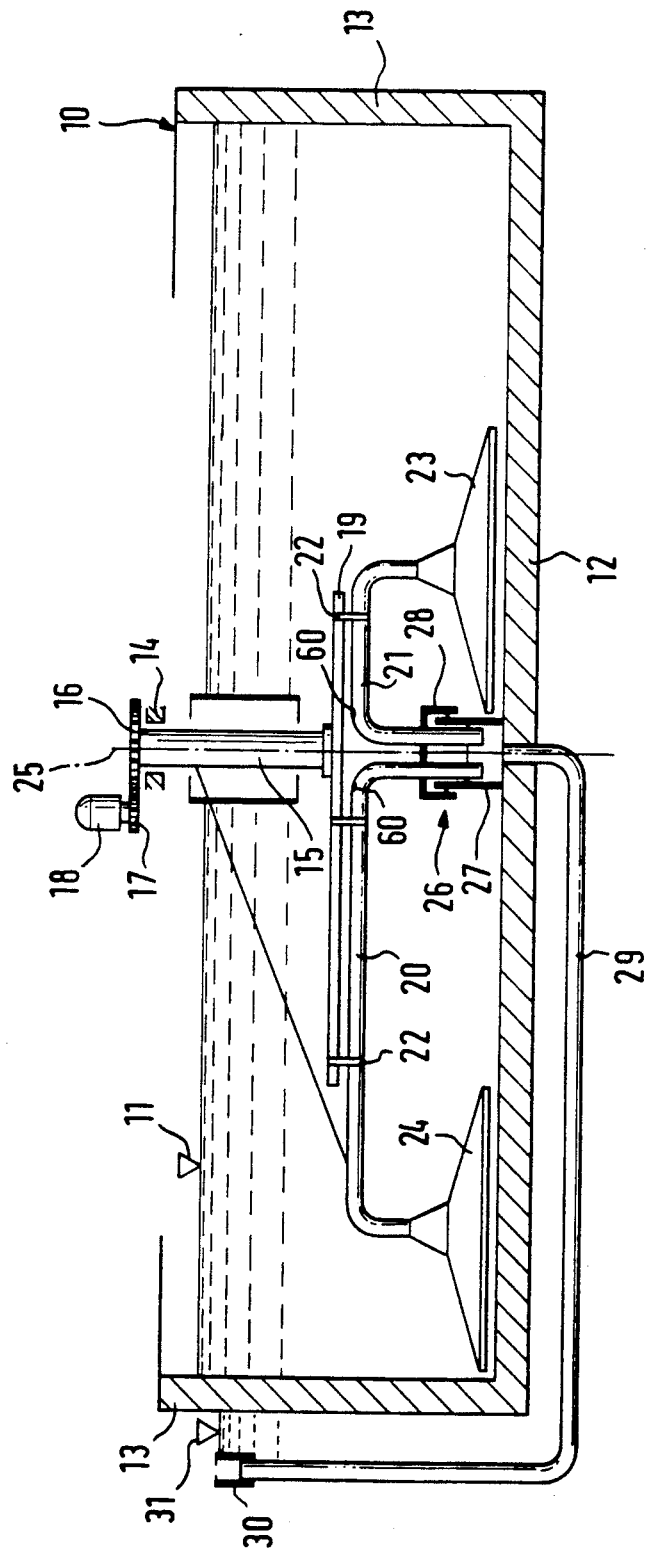
FIG. 1 shows diagrammatically a suction sweeping apparatus according to the invention.

FIG. 1 shows a circular settling basin 10 filled with water up to level 11. The basin 10 consists of a plane bottom plate 12 and a wall 13. A diagrammatically indicated bearing 14 surrounds a vertical rotary shaft 15, the axis thereof being aligned with the vertical axis of basin 10. A gear 16 is attached to the upper end of shaft 15 cooperating with a pinion 17 which in turn is driven by an electric motor 18. A beam 19 is attached to the shaft below the water level extending parallel and diametrically with respect to bottom plate 12. It serves for the attachment of two inversely U-shaped suction pipes 20, 21, the webs thereof being mounted to the beam 19 by fastening means not shown at more detail. Elongated suction mouth pieces 23, 24 are mounted on one end of the suction pipes. The mouth pieces extend shortly above the inner side of bottom plate 12, mouth piece 24 moving along the outer and mouth piece 23 moving along the inner annular area when the shaft 15 rotates. The suction pipes 20, 21 and their mouth pieces 23, 24, respectively, are located on diametrically opposed sides of the rotary axis indicated by 25.

A rotary connection 26 is located on the bottom plate 12 of basin 10. It consists of a pot 27 open from above and a cup-like lid 28 put onto pot 27 from above leaving a distance therefrom (see also FIG. 3). The adjacent legs of the inversely U-shaped suction pipes 20, 21 are sealingly extended through the sealing portion of lid 28 and being attached thereto. The legs extending into the space constricted by pot 27 and lid 28 and are immersed in the medium within the pot 27 down to a certain level.

An underground pipe 29 serving as sludge return line extends below the bottom plate 12 and extends through plate 12 into pot 27 from below. The other end is extended upwardly adjacent to the basin wall 13 and terminates for example in a pump sump not shown. The upper end coacts telescopically with a tube portion 30 adapted to be adjusted in its height. If the level thereof designated with 31 is below level 11, a sludge return can take place after the principle of communicating tubes. Additionally, a sludge pump can be arranged in line 29.

Figure 3:
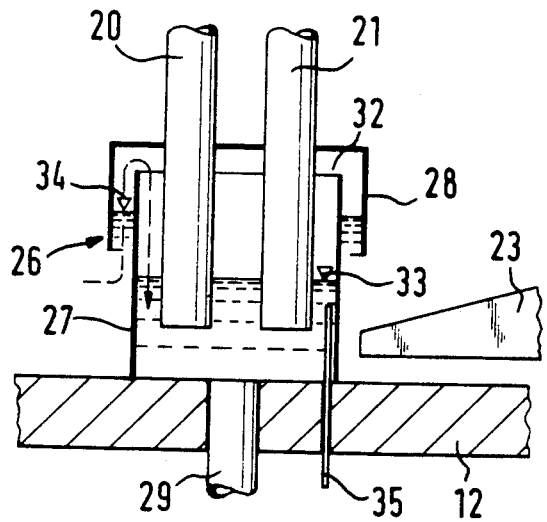
FIG. 3 shows a further detail of the the sweeping apparatus of FIG. 1 referring to the rotary connection.

As can be seen in FIG. 3, a gas cushion 32 is provided in the upper range of the space between pot 27 and lid 28. It separates flowable medium within pot 27 from the water in basin 10. The level of the medium within pot 2- is shown at 33. The level of the water between lid 28 and pot 27 is designated with 34. Thus, it is prevented that water from basin 10 may enter the interior of pot 27. A gas pipe 35 is extended through bottom plate 12 and into pot 27. Through pipe 35, gas, for example air, can be supplemented escaped slowly through a leakage. A supply of gas can also take place through pipe 29.

Due to the fact that the level 31 is below level 11 in the settling basin 10, sludge is sucked from the bottom of the settling basin through the mouth pieces 23, 24. The sludge is conveyed through the pipe 29. The different levels 33, 34 are only indicative for the flow losses of the sludge in the suction pipes 20, 21.

It may happen that due to leakages, the gas cushion 32 does not prevent entry of water into pot 27. It is possible to control the existence of the gas cushion by a sensor. This, however, is not necessary because the operator may note from the low viscosity of the sludge that water is discharged from the basin.

Figure 4:
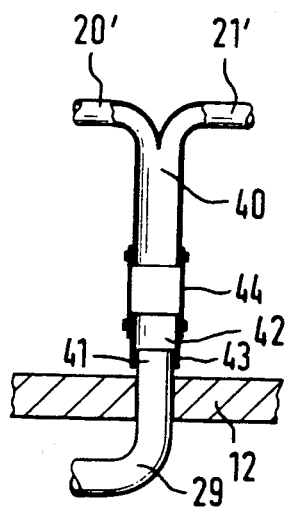
FIG. 4 shows an alternative embodiment for a rotary connection.
Figure 5:
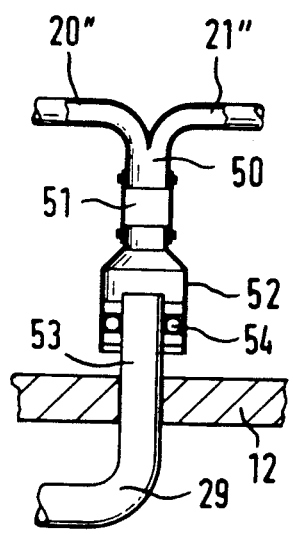
FIG. 5 shows a further alternative embodiment for a rotary connection.

As can be seen, the rotary connection 26 is completely free of wear. Therefore, it can operate a long time without necessitating maintenance. An alternative embodiment for the rotary connection is shown in FIGS. 4 and 5. In FIG. 4, two suction pipes 20', 21' are jointed by their inner ends forming a common tube 40. The underground pipe 29 has a tube portion 41 extending beyond the bottom plate 12. A sleeve 42 surrounds the end of tube portion 41 leaving a narrow gap 43 and thus forming a rotary connection. A hose portion 44 is mounted between sleeve 42 and the central tube 40 allowing a certain offset between the axis of the central suction tube 40 and the tube portion 41. Such a connection is subject to wear a certain extent, however, allows also longer operation intervals. The entry of undesired water from the basin depends upon the sealing within the annular gap 43.

In the embodiment of FIG. 5, the suction pipes 20', 21' are joined to a central pipe 50, the end thereof being connected with a hose portion 51. The other end of the hose portion 51 is placed on a sleeve 52 having a larger diameter surrounding the upwardly extending tube portion 53 of the underground pipe 29 at a radial distance. A rotary bearing 54 is located between sleeve 54 and tube section 53. The rotary bearing improves the easy running of the rotary joint and may contribute concurrently to a sealing effect.

As indicated in FIG. 1, small holes or orifices 60 are formed in the upper region of suction pipes 20, 21 serving for the venting of the suction pipes 20, 21. A venting is necessary to maintain the suction principle. It can be also carried out by vent valves.

Figure 2:
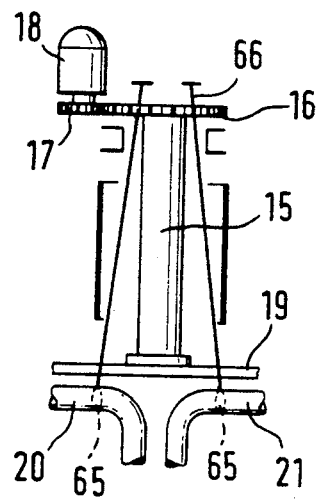
FIG. 2 shows a detail of the sweeping apparatus of FIG. 1.

FIG. 2 shows also suction pipes 20, 21 (partly). It can be seen that a throttling flap 65 or the like is provided to change the flow area. The throttling flap 65 can be actuated by an actuation rod 66 extending through gear 16. By means of the throttling flaps 65, the amount of sludge to be sucked can be adjusted. The rotatable flap can be substituted by another throttling member, e.g. a vertically actuable slider.

It is understood that the beam 19 can be substituted by a suspension by means of ropes, cables or the like.

In FIGS. 6 and 10, the parts which are equal to those of FIG. 1 are designated with the same reference numbers added by an index.

In FIG. 6, only the bottom plate 12a of a settling basin 10a is shown. Further, a bridge 70 is indicated diametrically overspanning the basin 10a. It can be seen that a water supply pipe 71 is extended through a central opening in the bottom plate 12a which is connected to an axial vertical water supply tube 72. The upper end of the water supply tube has a level half of the level of the water in basin 10a. An annular pot 27a open from above is located on the bottom plate 12a, an annular lid 28a being put thereon. As shown in FIG. 1, the ends of suction pipes 20a, 21a extend through the annular lid 28a. They are fixedly and sealingly connected to lid 28a. The support structure for the suction pipes 20a, 21a may be similar to that of FIG. 1. The rotary shaft is not shown in FIG. 6. In FIG. 6, openings are provided at diametrically opposed locations in the bottom plate 12a through which the ends of the sludge return line 29 are extended. In the area of supply line 71, the sludge return line 29a is bent around the supply line. An air cushion is included within the space between lid 28 and pot 27a as described in connection with FIG. 1.

In the embodiment according to FIG. 7, an annular pot 27 open from above is located on the bottom plate 12b, an annular lid 28b is put on pot 27b without engaging it as already described in connection with FIG. 1. While in the embodiment of FIG. 6, the supply tube 27 is separately extended upwardly into basin 10a, separately of pot and lid, the supply tube 72b is attached to lid 28b and sealingly extended therethrough, the lower end of the supply tube 72b forming the inner edge of the annular lid 28b. In the embodiment of FIG. 7, the rotary shaft 15b is provided which is hollow and suspended on the support structure 19b. The support structure 19b supports the suction pipes 20b, 21b and the lid 28b as well through the water supply tube 27b. A vertical strut or leg extends through the hollow rotary shaft 15b and the supply tube 72b and is attached to the bridge construction 70b by the upper end thereof. At the lower end, the strut includes radial support elements 74 supported in the opening of the bottom plate 12b for the water supply line 71b. By means of strut 23, the bridge 70b can be vertically supported. The rotary support of the rotary shaft 15b and the driving means therefor are not shown in FIGS. 6 and 7.

The structure of FIG. 8 substantially resembles that of FIG. 7 with the difference that an annular wall 25 is suspended by lid 28c having a small radial distance from the radially inner wall of the annular pot 27c. The wall is to serve for an improved and separate inclusion of the gas cushion in the space between pot 27 and lid 28 on one side and lid 28 and wall 25 on the other side.

The structure of FIG. 9 is substantially similar to that of FIG. 7 except the difference that a slightly modified water supply tube 72d is located in basin 10d. The supply tube 72d consists of an upper portion 76 connected to lid 28d, a flexible collar 77 being mounted to the portion 76 by means of a clamp or the like. The flexible collar 77 is connected to a tube portion 28 which cooperates telescopically with a tube portion 79 extending upwardly from the bottom plate 12d as an elongation of supply pipe 71d. The tube portion 29 is stationary while portion 26 rotates with the rotary shaft. Thus, a rotary connection is created in connection with the supply line.

The embodiment of FIG. 10 is substantially similar to that of FIG. 7 except the difference that the strut 73e is supported by a bridge 70e in a particular manner. To this purpose, a support plate 80 is connected with the upper end of strut 73e. A toothed disc 16e (see FIG. 1) is attached to the upper end of the hollow shaft 15e (the bearing for the disc 16e and the shaft 15e on a bridge structure 70e is not shown). An annular ball bearing 81 is located on disc 16a, the outer running race being fixedly attached to disc 16e. The support plate 80 is fixed to the inner race of the rotary bearing 81. The strut 73e which is supported by radial support elements 74e in the opening of the bottom plate 12e supports the rotating toothed disc 16e through support plate 80 (draws disc 16e through tension bolts or the like). If the bridge this has to be extended upwardly in order to establish a connection with bridge construction 70e through an auxiliary construction overbridging the driving means for the shaft by respective traverses.

A cylindrical tube 80' of larger diameter is attached to the support structure 19e or the hollow rotary shaft 15e, respectively. Thus, it rotates with the hollow shaft 15e. At the lower end sufficient space is left that water may enter the basin 10e flowing through supply tube 72e. The upper end of cylinder 80' extends slightly beyond the level of the water and thus serves for. limiting the floating sludge which can be withdrawn within the cylinder in a manner known per se. One or more vanes can be mounted on the outer side of cylinder 80' in order to agitate the water.

A conventional circular settling basin 100 which is not to be described at detail, is overspanned diametrically by a bridge 101. The stationary bridge 101 supports an electrical motor 101 for driving a central shaft 103. The driving means and the support of the shaft 103 is also not to be described at detail. A sweeping mechanism 104 is supported by shaft 103 having individual shields 105 for sweeping the bottom sludge. The bottom sludge is moved to the central funnel-like cavity 106 and is discharged therefrom through a discharge line 107. The supply of fresh water to be clarified takes place by means of a supply line 108 extending into the basin 100 from lateral. The discharge end is substantially located centrally adjacent to rotary shaft 103.

Figure 11:
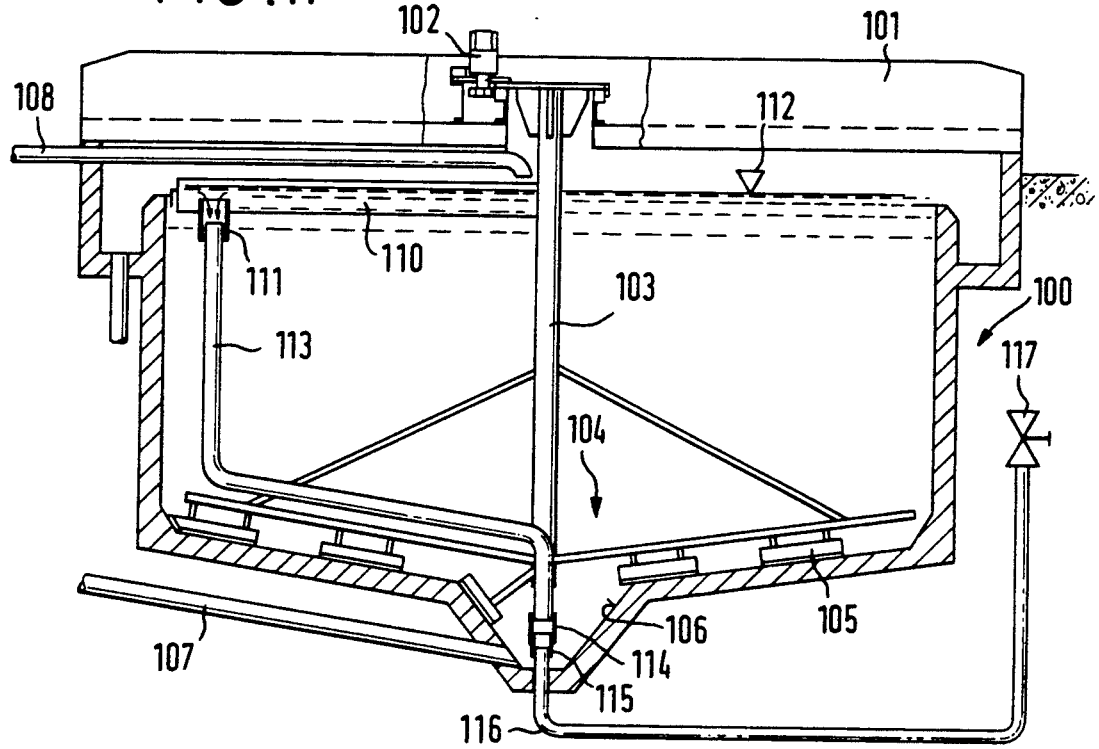
FIG. 11 shows a cross section through a circular tank having an apparatus according to the invention.

A sweeping shield 110 for floating sludge somewhat immersed into the liquid from above is fixedly secured to shaft 103 and extends radially of the shaft toward the wall of basin 100. A tube portion 111 is mounted on shield 102 not shown in any detail, the upper end of tube .portion being somewhat below the level in basin 100 indicated at 112. The tube portion 111 co-operates with the upper end of an S-shaped pipe portion 113 attached to the sweeping mechanism 104 in a manner not shown. The tube portion 111 telescopically co-operates with the upper end of line portion 113. The pipe portion 113 first extends vertically downwardly thereafter radially inwardly with a small slope in the area of the sweeping mechanism 104 and finally approximately centrally downwardly. An elastic sleeve 114 is fixedly connected with the lower end of pipe portion 113 which in turn retains a rigid sleeve 115. Sleeve 115 telescopically co-operates with the upper end of a stationary pipe portion 116 which centrally extends from below through the bottom into the funnel-like cavity 106 in basin 100. The pipe portion 116 extends outwardly of the basin 100 and is closed by a shut-off valve 117 as shown in FIG. 11. It may be connected to a drain channel or connected to a further pipe in order to discharge the floating sludge to a desired location. The pipe portion 116 can be provided with a pump. Upon rotation of shaft 103, the sweeping shield 110 is circularly moved. Pipe portion 113 moves synchronously and floating sludge is sucked from the surface of basin 100 due to the underpressure in pipe portion 113. The flexible sleeve 114 serves that a certain radial offset due to dynamic or static effects is compensated so that the rotary connection is not affected or even damaged.

Figure 12:
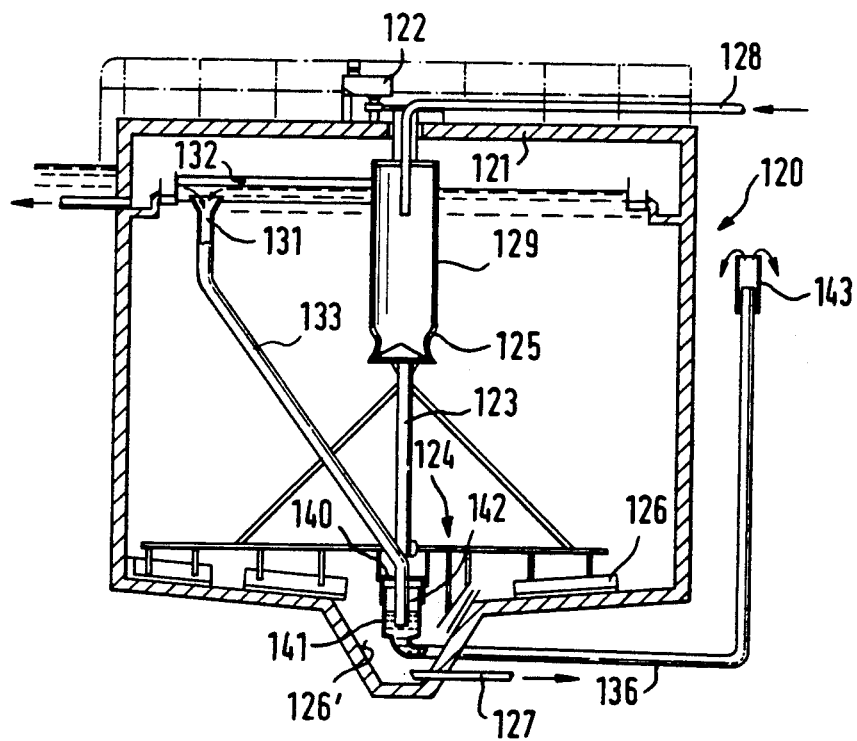
FIG. 12 shows a cross section through a circular settling basin including another embodiment of an apparatus of the invention.

In the embodiment of FIG. 12, a circular basin 110 is provided which is overspanned by a stationary bridge 121 similar to FIG. 1. Bridge 121 supports a driving mechanism 122 for a rotary shaft 123 which is centrally extended into basin 120 from above and suspends a sweeping mechanism 124. Shaft 123 is surrounded by a cylinder 124 which is attached to shaft 123. Fresh water to be clarified is supplied by cylinder 124, namely through a pipe 128 above bridge 121 extending to the center of basin 120 and into cylinder 124. Cylinder 124 has a plurality of openings 125 at the lower end for the discharge of fresh water to be clarified.

The support structure of the sweeping mechanism 124 onto which also the sweeping shields 126 are mounted supports a lid 140. The lid 140 is put on a pot 141 which is stationnarily located in the cavity 126'. The lower end of pot 141 is connected with a stationary discharge pipe 136 extended into cavity 126'. A gap is formed between the margin of lid 140 and the outer side of pot 141. A gas cushion 142 and pot 141 prevents the water in basin 120 from entering pot 141. A movable pipe portion 131 is sealingly extended through lid 140 and into pot 141. The upper funnel-like end 131 thereof is slightly below the level 132 in basin 120. A tube portion 143 telescopically coacts with the outer end of the stationary pipe portion 136. The upper end of tube portion 143 is below level 132 so that the floating sludge is withdrawn due to the static pressure difference. The use of a pump can be omitted.

The rotary connection formed by lid 140 and pot 141 is without wear since no parts engage each other. If necessary, the gas cushion 142 can be replenished from time to time through a supply line not shown.

FIG. 13 shows a circular basin 140 of known construction, a stationary bridge 151 diametrically overspanning the basin, the bridge 151 supporting a driving mechanism 152 for a rotary shaft 153. Details of the bearing and of the driving mechanism are not shown and not to be described. An entrance cylinder 164 is attached to shaft 153, the end of a supply line 158 for water to be clarified extending into cylinder 164, the supply line 158 extending radially approximately up to the center of basin 150 at the level of bridge 151. A traverse 153 mounted on shaft 153 extends diametrically, the longer portion thereof being additionally supported by a cable 171 connected to rotary shaft 153, the traverse supporting two suction pipes 172, 173. The lower ends of the suction pipes are connected with nozzle-like mouth pieces 174, 175 serving for withdrawing bottom sludge from basin 150. The radially inward ends of suction pipes 172, 173 are sealingly connected with lid 176 and extended therethrough into a pot 177. The lid 176 is put onto pot 177 without engaging it. An S-shaped movable pipe portion 183 is attached to traverse 170. The upwardly extending upper portion of pipe portion 183 co-operates with a telescopic sleeve 191 which in turn is attached to a sweeping shield 190. The approximately central lower portion of pipe portion 183 is also sealingly introduced into pot 177 through lid 176. Bottom sludge and floating sludge, respectively, is within pot 177 at level 193. A gas cushion 192 is enclosed in the space between lid 176 and pot 177 which prevents that liquid of basin 150 enters pot 177. A stationary sludge return pipe portion 196 is extended through the bottom of the basin and serves for the discharge of sucked floating and bottom sludge. The other end of pipe portion 196 extends to a collecting reservoir 197. The upper end telescopically co-operates with a tube portion 198 which position relative to pipe portion 196 determines the discharge outlet in reservoir 197. Appropriately, it is below the level 182 in basin 150. A pump can withdraw sludge through a lower outlet 199 of reservoir 197 to deliver the sludge to a desired location. The upper end of the telescopic sleeve 191 is somewhat below the level 182 to withdraw the floating sludge from the surface through a kind of sipping effect.

In FIG. 14, it can be seen that the sweeping shield 190 for the floating sludge is approximately V-shaped, and the entrance end 191 of the pipe portion 183 is within the area defined by the legs near the apex 190 of the shield.

A throttling member or a shut-off member in form of a flap or the like is located in the movable pipe portion 183 in order to change the cross section in pipe portion 183. The throttling member 200 is displaced through an actuation linkage 201 from outside.

If in the above, pipe, pipe portion, line or line portion are mentioned normally the same subject is meant. Anyway, the invention is not to be restricted thereby.

In FIG. 15 a water supply pipe 72f is elongated upwardly beyond level 11f. At the free end a ball bearing 210 is provided for the rotary bearing of a "half" sweeper bridge 211 which is supported on the edge of the basin by means of rollers. Suction pipes 211 are suspended by the sweeper bridge 211 through rods 213, suction mouth pieces being attached to the suction pipes (see also FIGS. 1 and 14). The suction pipes 214 are combined to a tube 216. The tube 216 extends through the annular lid 28f of the annular pot 27f (see also FIGS. 6 to 10). The lid 28f is additionally attached to sweeper bridge 211 by means of a further rod 217. During the rotation of sweeper bridge 211, the mouth pieces 215 move above the bottom of the basin and withdraw sludge which is discharged into pot 27f and moved away through sludge discharge line 29f. The water supply from water pipe 72f into basin 10f takes place through lateral ports 218. It is understood that the pipe 72f above the ports 218 can be made solid. The supply of voltage can be made through the central column structured as water supply 72f with a slip ring structure being necessary in the area of the rotary bearing 210.

What is claimed is:

1. An apparatus for removing sewage sludge deposited on the bottom in a circular settling basin, comprising a support structure rotatable about a central vertical axis and rotatably driven by driving means, a sludge removing line extending below the settling basin and introduced into said settling basin in the central area thereof, said sludge line removing said sludge outside of said settling basin, and removing means attached to said support structure, said removing means feeding said sewage sludge into the entrance end of said sludge line, said removing means including at least one pipe or the like attached to said support structure so that it rotates together with said support structure, said pipe being connected to said sludge line below the liquid level within said basin through a rotary connection means allowing a relative rotating movement, said rotary connection means including a pot open from above and centrally located in the basin, one end of said pipe extending into said pot, a lid having a downwardly depending margin being located above said pot, said pipe end being extended through the upper portion of said lid and sealingly and fixedly attached thereto, said lid being substantially without engagement with said pot, and an air cushion being provided in the space between said lid and said pot.

2. The apparatus of claim 1, wherein said support structure is suspended on a vertical rotary shaft coupled to said driving means.

3. The apparatus of claim 1, wherein a separate air supply line is extended into said pot, through the bottom of said basin.

4. The apparatus of claim 1, wherein said pipe is a part of suction means adapted to remove said sludge from said bottom of said basin, the entrance end of said suction means extending adjacent to said bottom.

5. The apparatus of claim 1, wherein an annular pot is located on said bottom of said basin, an annular lid being put on said pot forming an annular space for the accommodation of said air cushion, and a central space, a vertical water supply tube extending through said central space, the lower end of said tube being connected with a water supply line extending through said bottom of said basin, while the upper end of said tube extends upwardly beyond said lid.

6. The apparatus of claim 5, wherein the water supply tube is separately extended through the lid.

7. The apparatus of claim 5, wherein said water supply tube is attached to said lid, and has a radial distance from the inner wall of said annular pot.

8. The apparatus of claim 5, wherein a circular wall is suspended from said lid down into said annular pot having a small radial distance from the inner wall of said pot.

9. The apparatus of claim 5, wherein said water supply line has a vertical upright tube portion forming a rotary joint together with said supply tube in said basin.

10. The apparatus of claim 5, wherein the entrance end of said supply tube is below the level of said basin.

11. The apparatus of claim 5, wherein said support structure includes a hollow rotary shaft, a bearing for said rotary shaft being supported by a bridge or ceiling structure extending above said basin and being supported by the edge of said basin, a vertical strut being mounted on said bridge or ceiling structure extending through said hollow rotary shaft down to said water supply tube, said strut being supported by said supply tube or by said supply line, respectively, through radially extending fastening means, the upper end of said strut being either attached to said bridge or ceiling structure or to a bearing plate, a ball being being provided having two running races, one of said running races being connected to said bearing plate while the other of said races being connected to a gear, said gear being fixedly attached to said rotary shaft.

12. The apparatus of claim 5, wherein said water supply tube extends upwardly beyond the level in said basin, said tube having an upper and a lower end, said upper end defining a rotary bearing, a sweeper bridge being provided rotatably supported by the upper edge of said basin, said rotary bearing being associated with a central portion of said sweeper bridge, said water supply tube having at least a radial port located below said level in said basin.

13. The apparatus of claim 1, wherein said support structure supports floating sludge sweeping means having a floating sludge removing pipe, said pipe extending into said pot.

* * * * *

UNITED STATES PATENT AND TRADEMARK OFFICE
CERTIFICATE OF CORRECTION

PATENT NO. : 4,994,187
DATED : February 19, 1991
INVENTOR(S) : Glaser, et al

It is certified that error appears in the above-identified patent and that said Letters Patent is hereby corrected as shown below:

On the Title Page under "U.S. Patent Documents", reference to 3,136,724, "Sind et al" should be --Lind et al--.

Column 1, line 23, "FeststoffrUckhalts" should be --Feststoffrückhalts--.

Column 5, line 6, "2-" should be --27--.

Column 5, line 31, "jointed" should be --joined--.

Column 7, line 16, after "bridge" insert --construction 70e is to be supported directly by strut 73e,--.

Column 7, line 26, after "for" delete --.--.

Column 7, line 50, ".portion" should be --portion--.

Column 10, line 51, Claim 11, "being" (first occurrence) should be --bearing--.

Signed and Sealed this

Sixteenth Day of March, 1993

*Attest:*

STEPHEN G. KUNIN

*Attesting Officer*          *Acting Commissioner of Patents and Trademarks*